H. CHRISTENSEN AND W. STARRETT.
HARROW AND HARROW ATTACHMENT FOR TRACTORS.
APPLICATION FILED DEC. 27, 1920.
1,407,635.
Patented Feb. 21, 1922.
2 SHEETS—SHEET 1.
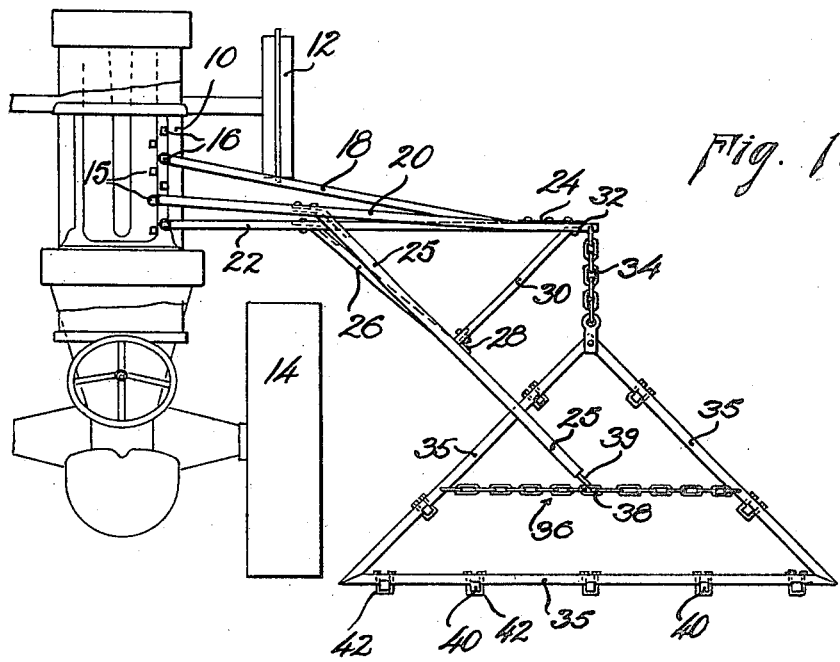
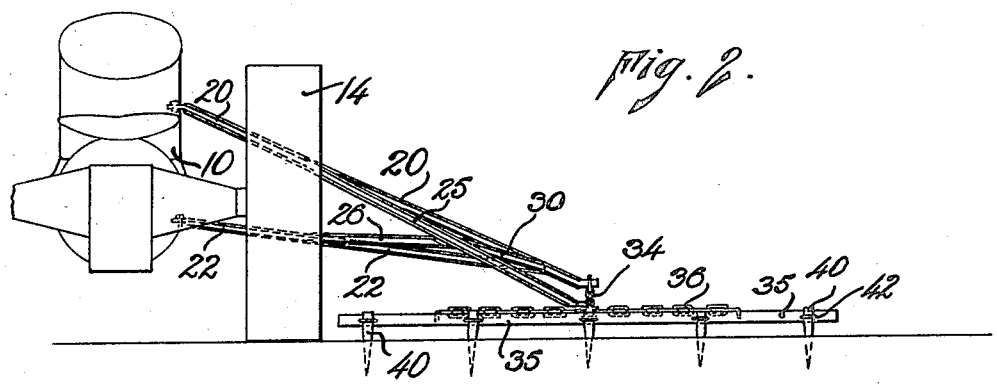
Hans Christensen & Wm. Starrett.
INVENTORS.
ATTORNEY.

H. CHRISTENSEN AND W. STARRETT.
HARROW AND HARROW ATTACHMENT FOR TRACTORS.
APPLICATION FILED DEC. 27, 1920.
1,407,635.
Patented Feb. 21, 1922.
2 SHEETS—SHEET 2.
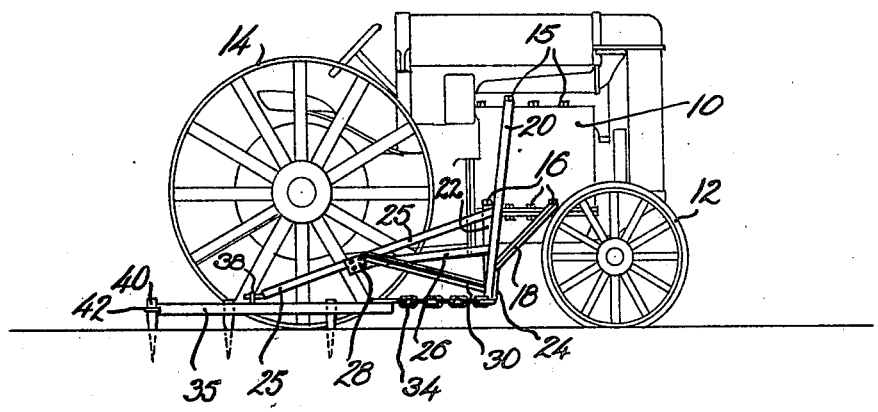
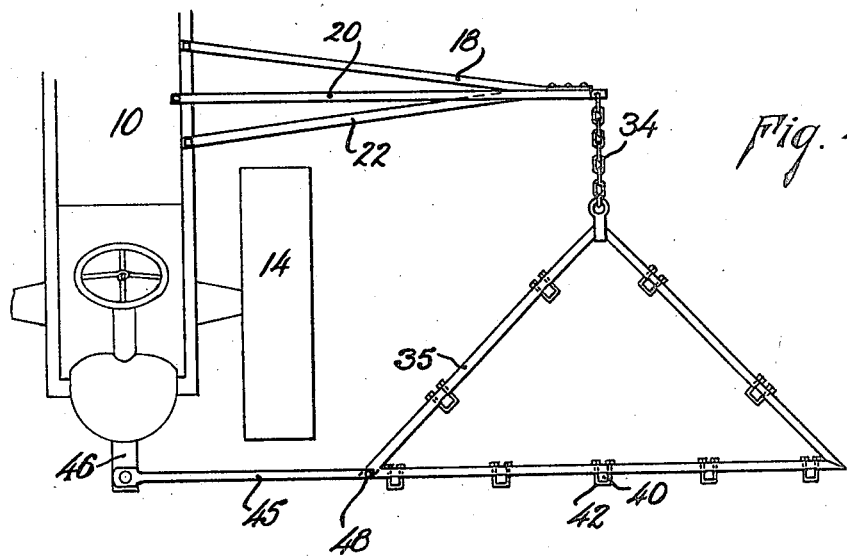

UNITED STATES PATENT OFFICE.

HANS CHRISTENSEN AND WILLIAM STARRETT, OF DENVER, COLORADO.

HARROW AND HARROW ATTACHMENT FOR TRACTORS.

1,407,635. Specification of Letters Patent. Patented Feb. 21, 1922.

Application filed December 27, 1920. Serial No. 433,243.

*To all whom it may concern:*

Be it known that HANS CHRISTENSEN and WILLIAM STARRETT, citizens of the United States, residing at the city and county of Denver and State of Colorado, have invented certain new and useful Improvements in Harrow and Harrow Attachment for Tractors; and they do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide means for attaching harrows to tractors, so that the same may be positively dragged by the tractors and more conveniently handled than has been possible heretofore.

Briefly, the invention comprises a plurality of braces connected to the tractor at one side of the engine and extending laterally therefrom between the wheels. Bolts already found on the engine preferably are used to connect the bracing arms. To the outer ends of these arms, which are connected with the engine, means is provided for connecting the harrow. Another brace is provided which extends between the harrow and said bracing arms or between the harrow and a draw bar extending from the rear of the tractor. In this manner the harrow is connected with the tractor at two points so that it is dragged along in fixed relation to the tractor and its wheels. Since the harrow is positioned at the side of the tractor in definite relation thereto, its movement may be positively controlled as desired.

In the drawings:

Figure 1 is a plan of one form of the invention;

Figure 2 is a rear elevation thereof and Figure 3 is a side elevation;

Figure 4 is a plan showing the connection where a rear draw bar is provided on the tractor.

Referring to Figures 1, 2 and 3, the engine 10 of a tractor is shown, said tractor being provided with front wheels 12 and rear wheels 14. In this style of tractor, the engine is provided with an upper series of bolts 15 and with a lower series of bolts 16. Three bracing arms 18, 20 and 22 project laterally from the side of the engine at different angles, the arm 18 being conveniently secured by one of the forward bolts 16, the arm 20 by one of the upper series of bolts 15, and the arm 22 by a rear one of the series of bolts 16. The outer ends of these arms converge and are secured together, as indicated at 24. A brace 25 is connected with an intermediate portion of the arm 20 and extends downward, outward and rearward, as shown. Another brace or spacing member 26 is connected with an intermediate portion of the arm 22 and extends outward and rearward where it is secured to an intermediate point of the brace 25, as indicated at 28. A third brace 30 extends from the point 28 to the end of the arms 18, 20 and 22, where it is secured as indicated at 32. A chain 34 or other suitable connecting means is provided at the outer ends of said arms for the connection of the forward extremity of a triangular harrow 35 conveniently constructed of three angle irons. A chain 36 or similar means extends transversely between the two side members of the harrow 35 and has its middle link 38 connected with a hook 39 on the brace 25. In this manner a positive connection is had at 34 between the harrow and the brace, and a second positive connection at 38. The harrow is provided with a plurality of teeth 40 which are vertically disposed and secured to the vertical sides of the angle irons as by means of U bolts 42. The various arms and braces may conveniently be constructed of angle iron.

In the modified form shown in Figure 4, the braces 25, 26 and 30 and the cross member 36 are omitted. In their place a spacing rod 45 is provided, one end of which is connected with the rear end of a draw bar 46 at the rear of the tractor, and the other end with the adjacent corner 48 of the harrow. Thus, in this construction also two points of connection of the harrow with the tractor are provided.

From the foregoing it will be seen that no matter whether the tractor moves along a straight path or curved path, the harrow 35 is positively dragged in a similar path and since it is definitely spaced from the tractor, its position can be definitely controlled and the work satisfactorily completed. It will be noted that it will be possible to harrow corners and other spaces where it has been impossible heretofore to drag a harrow.

We claim:

1. In combination, a tractor, a truss work connected thereto, said truss work comprising two bars connected together near their outer ends and having their inner ends connected respectively to two horizontally spaced bolts on said tractor whereby a triangular structure is formed, a third bar having its outer end connected near the outer vertex of said triangular structure and its inner end connected to a bolt on said tractor at a point spaced vertically from the points of attachment of said two bars, whereby a rigid outwardly projecting structure is formed for attachment to an agricultural implement.

2. A device in accordance with claim 1 in which a bar is connected to one of said outwardly extending bars and projects therefrom at an angle whereby means is provided for spacing said agricultural implement from said tractor.

3. A device in accordance with claim 2 in which said angularly extending bar is connected to the vertex of said outwardly extending structure by a rigid member.

4. A device in accordance with claim 1 in which two rearwardly extending bars connected together at one point have their corresponding ends connected respectively to the rearward and the topmost members of said outwardly projecting structure.

5. A device in accordance with claim 4 in which said rearwardly extending bars are rigidly connected to a point near the outer extremity of said outwardly extending structure.

In testimony whereof we affix our signatures.

HANS CHRISTENSEN.
WM. STARRETT.